Patented Feb. 7, 1933

1,896,171

UNITED STATES PATENT OFFICE

JOHN CHARLES HARRY, OF EL PASO, TEXAS

IODINE PREPARATION AND PROCESS OF MAKING THE SAME

No Drawing.   Application filed February 20, 1932. Serial No. 594,386.

This invention relates to an iodine preparation particularly adapted for therapeutic and pharmacological purposes. The product of this invention has numerous novel characteristics which distinguish it from prior preparations containing iodine. For example, the product of this invention may be applied externally or it may be taken orally, and even prolonged use in relatively large amounts will not give rise to iodism or iodine poisoning, nor cause blistering, irritation or other undesired results generally produced by iodine preparations of the prior art.

The invention also relates to a particular method of making the product, whereby the product is caused to contain iodine in what appears to be free form.

The therapeutic and medical value of iodine has been recognized for a considerable period of time and although there are certain brilliant instances of its effective use, the art has recognized the danger of employing iodine preparations now available because of the toxic effects produced in a great many instances, particularly when such preparations are administered orally.

The art has recognized the probable desirability of producing and using a product containing iodine in free form, but such product containing any appreciable quantity of free iodine, has not been made heretofore. The products of the prior art generally consisted of iodides and iodates, or salts of compounds containing iodine, and reference is here made to pharmacological preparations, syrupus iodotannicus, which is an aqueous solution containing only about ¼ of 1% of iodine combined with about ½% of tannic acid, phenol iodatum, which is a glycerine solution high in phenol, containing about 30% of phenol and 10% of iodine, and lugol solution, which is a solution containing iodine and potassium iodide.

All of these preparations are toxic in effect and the first two cause considerable irritation and blistering when applied externally. The toxic effects of such prior preparations are customarily attributed to the fact that the iodine content is in the form of compounds or salts such as phenol iodates, alkaline iodides, etc. The product of this invention, however, contains iodine in free or nascent form and even though crystalline iodine causes severe burns when brought in contact with the bare skin, the free iodine of this product does not cause burns or irritation.

It has been found that the product of this invention is particularly adapted for use in the treatment of gastric ulcers, goiter, nephritis, bronchitis, arteriosclerosis, overitis, endometritis, hoemophilia, angina pectoris, syphilis, salpingitis, vaginitis, gonorrhea of the female, and in numerous other instances where the de-obstruent powers of the preparation can be efficaciously used. Furthermore, repeated and prolonged internal administration of the iodine preparation of this invention does not cause gastric disturbances, softening of the gums, or other evidences of iodism.

It has also been found that the preparation of this invention may be applied repeatedly even to very tender areas without causing blistering or irritation, and for this reason, is particularly adapted for treatment in laryngitis, tonsillitis, pharynitis, pyorrhea, in cases of ring-worm, mange, favus, etc.

The product of this invention may be said to be a colloidal suspension and/or solution of iodine in glycerine and/or glycerol. It has been found desirable to have tannin or tannic acid present in the solution. Furthermore, it has been found desirable in a great many instances to have phenol and a very minor proportion of menthol also present. The free iodine contained in the product of this invention is in solution in the liquid vehicle and even though the product contains free iodine in quantity in excess of that normally dissolved by the vehicle, such large amount of free iodine can not be removed from the vehicle by filtration.

An object of this invention is to disclose and provide a liquid glycerine or glycol product containing free iodine in colloidal solution and suspension.

Another object of this invention is to disclose and provide a product for therapeutic purposes consisting essentially of a substantially dehydrated glycerine solution containing tannic acid and iodine in colloidal suspension and/or solution.

A further object of this invention is to disclose and provide a glycerine solution containing tannin and phenol, and iodine in substantially free form.

A still further object of this invention is to disclose and provide a substantially dehydrated glycerol solution containing iodine in free form, the product being non-toxic and non-irritating.

An object of this invention is to disclose and provide a process of producing a solution suitable for therapeutic use and containing iodine in colloidal suspension or solution, the product being characterized by its non-toxic and non-irritating properties.

Another object is to disclose and provide a method of impregnating glycerine with relatively large quantities of iodine in substantially free form.

A still further object of this invention is to disclose and provide conditions and proportions desirable for the preparation of a therapeutic product containing available iodine.

Other objects, uses and advantages of this invention will become apparent to those skilled in the art from the following detailed description of a preferred mode of operation and of a preferred product, it being understood that the invention is not limited to the specific ingredients, quantities or conditions there set forth but embraces numerous changes and modifications which can be made without departing from the spirit of the invention or without materially altering the characteristics of the resulting product.

Hereinafter, reference will be made to the use of tannin and this is understood to refer to the purified form of tannin or tannic acid, generally considered to consist of digallic acid. Furthermore, although the specific examples of the process referred to hereinafter utilize glycerol or glycerine as the vehicle for the iodine, it is to be understood that glycol may be used instead of glycerol.

One method of preparing the product which has been found to be particularly efficacious, comprises forming a solution of glycerol and tannin and then absorbing the vapors of iodine in such solution. From about 4 to 10 parts of tannin or tannic acid may be dissolved in 100 parts of glycerol. It is essential that the glycerol be substantially dehydrated before the iodine vapors are dissolved therein. The iodine vapors may be generated within the glycerol solution or iodine may be vaporized separately and the vapors then passed through the glycerol solution. The amount of iodine dissolved in the glycerol solution may vary within wide limits, that is, the iodine content of the final product may range up to about 50%. For ordinary therapeutic use, the product should contain from about 5% to 10% of iodine. During the absorption of the iodine in the glycerol solution, the solution is preferably kept at a temperature of between about 230° F. and 260° F. when at atmospheric pressure.

The following procedure has been found to be effective in producing a desired product:

100 parts of glycerol were gradually heated to 240° F. and maintained at such temperature until the glycerol was substantially dehydrated. Thereafter, 7 parts of tannic acid were added with agitation so as to form a solution. The tannic acid—glycerol solution was then raised to 250° F. and a mixture of iodine and phenol added in the proportion of about 7 parts of iodine and 1 part of phenol by weight, per 100 parts of the original glycerol solution. The mixture of iodine and phenol was added to the glycerol—tannic acid solution while the latter was maintained at 250° F. with vigorous agitation. Vaporization of the iodine takes place, the vapors being immediately absorbed by the solution, imparting a brown coloration thereto. The agitation may well be continued for a period of 10 to 25 minutes, whereupon the heat supplied may be discontinued and the solution allowed to cool. The cool solution may then be filtered so as to remove a certain minor quantity of solid matter which is precipitated during the process. Prior to such filtration, and particularly when the resulting product is to be used internally, it is desirable to add menthol or oil-of-peppermint. Pure menthol is to be preferred to the oil. Advantageously, a mixture of menthol and phenol may be added to the solution, the phenol maintaining the menthol in solution and facilitating the incorporation of this ingredient into the product. The quantity of menthol and phenol added at this stage, should not exceed about 1% of the total product. A product containing 0.25% menthol, is satisfactory.

The addition of menthol is preferably made while the solution is still warm, that is, at a temperature of between 150° F. and 200° F. and preferably at about 180° F. After the introduction of menthol in the manner described hereinabove, the iodine-containing glycerol solution may be allowed to cool and then filtered. The product is now ready for use. In view of the exceedingly hygroscopic nature of glycerol, it is desirable to keep the product in tight containers so as to prevent access of air or moisture. Furthermore, it is desirable to store the product at a low temperature so as to prevent decomposition or a loss of absorbed iodine.

It is to be understood that the presence of phenol in the product is not essential, although tannic acid should be used in the process. A product made as described hereinabove will contain about 86.5% glycerol, 6.4% tannin, 6.4% iodine, about 0.5% phenol, and about 0.2% menthol. Obviously, the proportion of iodine in the product may be varied materially by varying the quantity of iodine added to the glycerol—tannic acid solution during the absorption step.

A modification of the process may comprise the formation of a glycerol or glycol—tannic acid solution, the dehydration of this solution, and the passage of iodine vapors into said solution until the desired quantity of iodine is absorbed and retained therein. It has been found desirable to have the rate of iodine production relatively rapid, a greater quantity of iodine being thus absorbed than if the rate of iodine introduction is low.

During the passage of the vapors into the glycerol—tannic acid solution, the solution should be maintained at a relatively high temperature, that is, at a temperature of between about 200° F. and 250° F. If, however, the iodine vapors are brought into contact with a rapidly agitated or rapidly moving stream of glycerol—tannic acid solution, then the temperature of said solution need not be as high. The absorption of iodine by the glycerol solution appears to be facilitated by having such absorption take place at the preferred temperature of around 235° F. to 260° F.

As has been stated hereinbefore, the product produced in the manner described hereinabove, is non-irritant even to the mucous membrane and is non-toxic when administered orally for any length of time in appropriate doses of say 5 to 30 drops of 3 times a day. It is an anti-bacterial antiseptic, astringent, stimulant and hemostatic adapted both for internal and external use.

The iodine is apparently in free or elemental form. Although the solubility of iodine in glycerol is approximately 0.97 parts in 100 parts, it is evident that the iodine is not solely in solution because of the large quantities of iodine present in the product. Furthermore, when the product is diluted with distilled water, it shows the characteristic violet color of free iodine.

It may be mentioned here that the product may be used either in the form resulting from the process described hereinabove, or it may be diluted with distilled water, alcohol or other suitable solvent depending upon the purpose to which it is to be applied. Furthermore, it is to be noted that the product is free from iodides or other alkalies generally used to facilitate the solution of iodine. This freedom from iodides is apparently one of the reasons why the product is non-toxic.

The determination of iodine in the product requires a specific technique which it may be desirable to here describe. The portion of the product should be agitated in a flask containing a similar volume of carbon disulfide and a very few drops of dilute sulfuric acid. The mixture should then be contacted with vapors of red fuming nitric acid and after vigorous agitation, the carbon disulfide, together with its extracted iodine, separated from the residual material. The iodine contained in the carbon disulfide may then be tested with sodium thiosulfate, using starch as an indicator. Ordinary methods of analysis for free iodine and/or total iodine present may give negative results.

From the characteristics of the product described hereinabove, it will be evident that a very useful and novel product has been made available. As has been pointed out hereinabove the prior iodine-containing therapeutic products have been both toxic and irritating, whereas the product of this invention is non-toxic and non-irritating, although it has very pronounced antiseptic, anti-bacterial, hemostatic and deobstruent powers. Furthermore, the product is free from iodides and iodates and the iodine content is much higher than that of any therapeutic preparation of the prior art.

What is most important, however, is that the iodine is present in what appears to be free form, as is evidenced by the violet coloration of the solution when examined in a thin film or when diluted with distilled water.

Although specific embodiments of the process have been described in considerable detail it is to be understood that the invention is not limited thereto but instead embraces all such modifications and changes as come within the scope of the appended claims.

I claim:

1. In a process of making an iodine preparation for therapeutic purposes containing free iodine in amounts exceeding 1% the step of absorbing vapors of iodine in a solution of a substantially dehydrated material selected from the group consisting of glycerol and glycol and tannic acid.

2. In a process of making an iodine preparation for therapeutic purposes the step of absorbing vapors of iodine in a solution of a substantially dehydrated material selected from the group consisting of glycerol and glycol and tannic acid while maintaining said solution at a temperature of about 230°–260° F. whereby the product is caused to contain more than 1% free iodine in stable form.

3. In a process of making an iodine preparation, free from solids, for therapeutic purposes the steps of dehydrating glycerol, dissolving tannic acid in the glycerol, heating the glycerol solution to about 230°–260° F., absorbing vapors of iodine in the heated solution and then cooling the solution to below 100° F. and filtering the cooled solution to remove solids whereby the filtered solution contains free iodine in amounts exceeding 1%.

4. In a process of making an iodine preparation for therapeutic purposes containing more than 1% of free iodine the steps of dehydrating glycerol, dissolving tannic acid in the glycerol then heating said solution to a temperature of about 230°–260° F., absorbing vapors of iodine in said heated solution, cooling the resulting glycerol-iodine solution to between 150°–200° F., adding a solution of menthol and phenol to said cooled solution, then further cooling the solution to below 100° F., and finally filtering the cooled solution to remove solids.

5. In a process of making an iodine preparation for therapeutic purposes containing more than 1% of free iodine, the steps of forming substantially dehydrated solution of glycerol and tannic acid in the proportion of between about 5–10 parts of tannic acid per 100 parts of glycerol and then absorbing vapors of iodine in said solution.

6. In a process of making an iodine preparation for therapeutic purposes, the steps of forming a substantially dehydrated solution of glycerol and tannic acid containing 5–10 parts by weight of tannic acid to 100 parts of glycerol, heating said solution to a temperature of between about 230°–260° F., vaporizing iodine and passing iodine vapors into said heated solution to form a colloidal suspension and solution of free iodine in amount exceeding 1% in said glycerol tannic acid solution.

7. In a process of making an iodine preparation for therapeutic purposes, the steps of forming a substantially dehydrated solution of glycerol and tannic acid, heating said solution to a temperature of between about 230°–260° F. and then adding finely divided iodine to said solution while agitating the mixture so as to vaporize said iodine in the presence of said solution and absorb free iodine vapors therein.

8. A stable therapeutic product comprising a substantially dehydrated material selected from the group consisting of glycerol and glycol, containing not more than about 10% of tannic acid in solution and containing free iodine in solution in quantity in excess of 1%.

9. A therapeutic product consisting of a substantially dehydrated solution of glycerol containing between 3% and 10% of tannic acid and from 2% to 50% of free iodine in colloidal suspension and solution therein, said product being non-toxic when administered orally to the human organism and non-irritating when applied externally.

10. A therapeutic product consisting of a substantially dehydrated glycerol solution containing tannic acid and free iodine in solution in amount exceeding 1%, said product being stable and non-toxic when administered orally to the human organism and non-irritating when applied externally.

11. A stable therapeutic product comprising a material selected from the group consisting of glycerol and glycol, containing tannic acid in solution and free iodine in solution in quantity in excess of 1%.

12. A stable therapeutic product comprising a solution of not more than about 10% of tannic acid in glycerol, said solution containing more than 1% of free iodine in solution.

13. A therapeutic product comprising essentially a solution of tannic acid in glycerol, said solution containing free iodine in quantity in excess of 1%, said product being stable and non-toxic when administered orally to the human organism.

Signed at Los Angeles, Calif., this 13th day of February, 1932.

JOHN CHARLES HARRY.